No. 656,220. Patented Aug. 21, 1900.
G. H. F. SCHRADER & H. P. KRAFT.
VALVE FOR PNEUMATIC PILLOWS, &c.
(Application filed July 31, 1997.)
(No Model.)
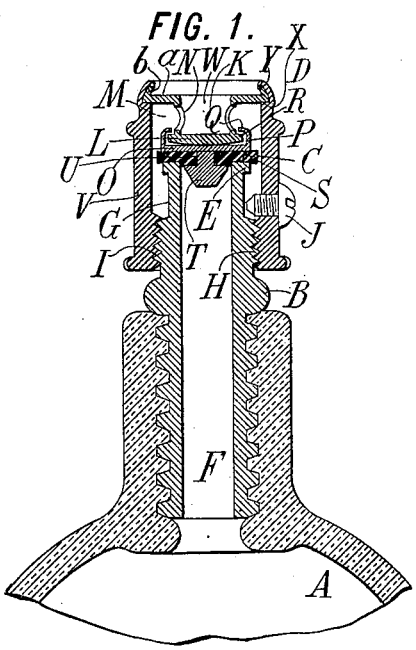
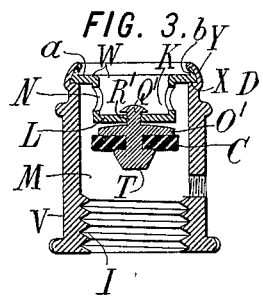
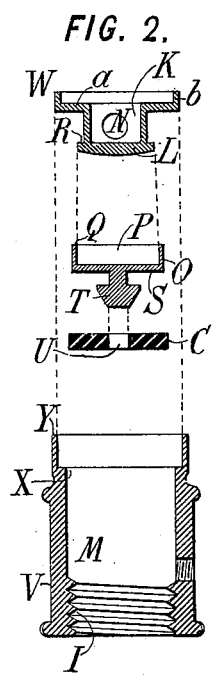
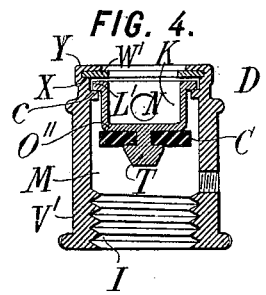
INVENTORS:
George H. F. Schrader
and Henry P. Kraft,
By their Attorneys,

UNITED STATES PATENT OFFICE.

GEORGE H. F. SCHRADER AND HENRY P. KRAFT, OF NEW YORK, N. Y.; SAID KRAFT ASSIGNOR TO SAID SCHRADER.

VALVE FOR PNEUMATIC PILLOWS, &c.

SPECIFICATION forming part of Letters Patent No. 656,220, dated August 21, 1900.

Application filed July 31, 1897. Serial No. 646,589. (No model.)

*To all whom it may concern:*

Be it known that we, GEORGE H. F. SCHRADER and HENRY P. KRAFT, citizens of the United States, and residents of the city, county, and State of New York, have jointly invented certain new and useful Improvements in Valves for Pneumatic Pillows and other Articles, of which the following is a specification.

This invention relates to valves, and is especially applicable to valves for air-pillows.

The invention aims to provide an improved valve of simple and economical construction, which shall be facile and efficient of operation and of great durability.

Heretofore much difficulty has been encountered in valves for pneumatic pillows by reason of the early destruction of the packing-washer because of distortion of the latter as it is compressed between the stationary and rotary members of the valve. The stationary member has usually been a screw-threaded tube molded in the article to which it is applied, the end of which tube has been inclosed in a cup-shaped cap, to the upper end of which a washer has been fixed within the cap, revolving the cap and serving to screw it toward or from the end of the tube to seat or unseat the washer thereover.

In carrying out the preferred form of our present improvements we provide an improved swivel construction for carrying the washer within the cap, and we provide an improved construction of cap whereby the washer need not rotate during the opening and closing of the valve and the construction of the cap is greatly simplified and cheapened.

In the accompanying drawings, which illustrate the preferred form of our invention, Figure 1 is an axial section of our improved valve as applied to an air-cushion, the cushion being shown fragmentarily; and Fig. 2 is an axial section of the several parts of the cap before being assembled and attached together. Figs. 3 and 4 are axial sections of modifications.

Referring to the drawings, let A indicate an air-pillow or other hollow article; B, a valve-tube cemented or otherwise attached therein; C, a valve proper seating on the end of this tube, and D a rotary cap embracing and swiveled on the end of the tube for inclosing and operating the valve proper.

The tube B may be of any suitable construction, that shown being the construction ordinarily employed by us, in which the outer end of the tube has a wide seat E, from which a duct F extends to the inner end of the tube, communicating with the interior of the pillow, the tube having an external groove G near its end and an external screw-thread H inwardly of this groove.

The valve proper may be any suitable valve, that shown consisting of a packing-ring, washer, or disk opposite the seat E and carried by the cap D.

The cap D is, as usual, a cup-shaped member embracing the end of the tube B and having an internal screw-thread I engaging the screw H of the tube, and a screw or other stop J playing in the groove G and limiting the unscrewing movement of the cap. The cap carries the valve proper, C, moving it toward and from the seat E as the cap is screwed on or off the tube. The cap has a tubular inwardly-extending neck K, terminating in a head L, for carrying the valve proper, and has an internal chamber M, and the said neck is provided with an inlet-duct N for affording communication to and from the valve proper.

According to one feature of our invention we make the valve proper and cap independently rotative, preferably by swiveling the former to the latter. This is best accomplished by our improved carrier O, which is a metal plate having a cup-shaped socket P in its upper side receiving the head L and rotatively attached thereto, preferably by having an inturned flange Q, which overhangs a shoulder R on the head. This carrier has a flat bottom face S and a headed central projection or stud T, which passes through a hole U in the washer, and thereby fastens the latter to the carrier. The carrier is imperforate, so that there are no joints for leakage of air through it, and leakage between it and the seat E is prevented by the compression of the washer around the seat. The bottom of the socket P or the bottom face of the head L, preferably the latter only, is slightly rounded, so as to permit a slight rocking of the valve proper for securing a true seating thereof.

According to another feature of improvement the cap D is made of separate members or parts united together, the one being the main body V and the other the top W. The body V is preferably of turned metal, having a shoulder X within its outer end, beyond which it has a thin flange Y. The top W is preferably of turned metal, having the neck K and head L, a flat wall $a$, surrounding the neck, and an upturned flange $b$ at the extremity of this wall. The flange $b$ fits snugly within the flange Y, and the wall $a$ rests on the shoulder X, after which the flange Y, which is longer than the flange $b$, is crimped in over the top edge of the latter, and the two flanges are then bent or swaged inwardly to lock the parts together with a concealing joint, as shown in Fig. 1. Before thus uniting the parts the carrier O is coupled loosely to the part W by fastening it to the head L, as explained. With this construction a wide valve proper can readily be applied to the interior of the cap above its screw-thread I and the cap can be cheaply and lightly constructed. After the cap has been applied to the tube B the parts are prevented from separating by the stop-screw J or in any other manner.

In using our invention the washer will be forced to its seat by the cap closing the valve and will remain stationary on the seat as the cap is rotated to screw it down tight, the friction of rotation being exerted between the bottom face of the head L and the carrier O. Thus there will be practically no torsional strain on the washer, so that its life will not be shortened by repeated opening and closing of the valve. The loose connection between the cap and carrier will permit of these parts compensating for any irregularities or imperfections in construction, so that the valve can seat truly without the necessity of unequal compression of the washer.

It will be seen that our improvements can be readily and advantageously availed of, and it will be understood that we do not limit ourselves to the exact details of construction, arrangement, and combination hereinbefore set forth as constituting the preferred form of our invention, since the invention can be employed according to such modifications as circumstances or the judgment of those skilled in the art may dictate without departing from the spirit of the invention.

In Fig. 3 the carrier O' is shown as provided with a top projection Q', which is riveted through a hole R' in the head L.

In Fig. 4 the carrier O'' is formed integrally with the neck K and has a flange L' rotatively connecting the carrier to the cap by being fastened between a flange $c$ on the member V' and the top W', which latter is a ring held on the shoulder X by the flange Y.

What we claim is—

1. For air and other valves, a cap D consisting of a tubular member V having a screw-thread I, a chamber M, an internal shoulder X, and a flange Y, in combination with a part W having a head L within said chamber, a wall $a$ resting on said shoulder, and a flange $b$ fitting within said flange Y, said flange Y overhanging said flange $b$ and uniting said parts together.

2. In valves for air-pillows and for other articles, the combination with a tube B having a seat E, and external screw-thread H, of a tubular cap D inclosing the end of said tube, having an internal screw-thread I engaging that of the latter, a tubular neck connected at its upper end to said cap, projecting into said cap, and having a head, a valve proper C engaging said seat, and a carrier O carrying said valve proper and swiveled to said head.

3. In valves for air-pillows and for other articles, a tube B having a seat E and external screw-thread H, in combination with a cap D embracing the end of said tube, having an internal screw-thread I engaging the thread thereof, having an inwardly-extending tubular neck at its upper end, and a flanged head L at the extremity of its neck, a valve proper engaging said seat, and a metal carrier carrying said valve proper and having a socket P embracing said head, and an inturned flange Q surrounding said neck.

4. For air and other valves, a cap member consisting of a cap D having an internal chamber M, a tubular neck and a head L in said chamber, a valve proper C carried by said cap in said chamber, and a carrier O carrying said valve proper and swiveled to said head.

5. For air and other valves, a cap D having an internal chamber M, a tubular neck open at its upper end and having a head at its lower end, and having an intermediate lateral opening within said chamber, and a valve proper carried by said cap on the inner side of said head within said chamber.

6. In valves for air-pillows and other articles, the combination with a tube B having a seat E, and an external groove below said seat, of a cap inclosing the end of said tube, a valve carried by said cap for engaging said seat, and a screw J carried by said cap and projecting into said external groove.

In witness whereof we have hereunto signed our names in the presence of two subscribing witnesses.

GEORGE H. F. SCHRADER.
HENRY P. KRAFT.

Witnesses:
GEORGE H. FRASER,
THOMAS F. WALLACE.

It is hereby certified that in Letters Patent No. 656,220, granted August 21, 1900, upon the application of George H. F. Schrader and Henry P. Kraft, of New York, N. Y., for an improvement in "Valves for Pneumatic Pillows, &c.," an error appears requiring correction, as follows: At the heading of the drawing, the date of filing the application, "July 31, 1997," should read *July 31, 1897;* and that the said drawing should be read with this correction therein that the same may conform to the record of the case in the Patent Office.

Signed, countersigned, and sealed this 25th day of September, A. D., 1900.

[SEAL.]
F. L. CAMPBELL,
*Assistant Secretary of the Interior.*

Countersigned:
WALTER H. CHAMBERLIN,
*Acting Commissioner of Patents.*